United States Patent
Wesley

(10) Patent No.: US 10,354,269 B2
(45) Date of Patent: Jul. 16, 2019

(54) SYSTEM AND METHOD FOR ADMINISTERING A LOYALTY PROGRAM AND PROCESSING PAYMENTS

(71) Applicant: Modiv Media, Inc., Quincy, MA (US)

(72) Inventor: Robert J. Wesley, Wellesley, MA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 14/979,756

(22) Filed: Dec. 28, 2015

(65) Prior Publication Data

US 2016/0110753 A1  Apr. 21, 2016

Related U.S. Application Data

(63) Continuation of application No. 14/337,100, filed on Jul. 21, 2014, now Pat. No. 9,224,154, which is a
(Continued)

(51) Int. Cl.
*G06Q 30/02* (2012.01)
*G06Q 20/20* (2012.01)
(Continued)

(52) U.S. Cl.
CPC ......... *G06Q 30/0226* (2013.01); *G06Q 20/20* (2013.01); *G06Q 20/32* (2013.01);
(Continued)

(58) Field of Classification Search
CPC ........ G06Q 30/02; G06Q 20/32; G06Q 20/20; G06Q 30/0238; G06Q 20/322;
(Continued)

(56) References Cited

U.S. PATENT DOCUMENTS 5,056,019 A  10/1991  Schultz et al.
5,221,838 A  6/1993  Gutman et al.
(Continued)

FOREIGN PATENT DOCUMENTS

JP  2001-256398 A  9/2001
JP  2001-282796 A  10/2001
(Continued)

OTHER PUBLICATIONS

International Search Report and Written Opinion issued for PCT application PCT/US2007/072757; dated Jan. 28, 2008; 10 pages.
(Continued)

*Primary Examiner* — Christopher Stanford
(74) *Attorney, Agent, or Firm* — McDermott Will & Emery LLP

(57) ABSTRACT

The present invention is directed to a system and method for administration of a customer loyalty program at a point of sale terminal. The system, in one embodiment, contains a database of customer records for the loyalty program where each customer record contains information about a customer's payment device and information about a customer's mobile device. The system may locate a customer record in a database based on payment device or mobile device information captured at the point of sale terminal and apply any applicable loyalty program discounts. The system may then forward the payment device information to a third-party payment processor for payment processing. The system may print out a receipt at the point of sale terminal indicating any discounts and containing a promotional message. The system may also send a promotional message to the customer's mobile device using the mobile device information stored in the customer's record.

44 Claims, 8 Drawing Sheets

Related U.S. Application Data continuation of application No. 11/486,707, filed on Jul. 14, 2006, now Pat. No. 8,783,561.

(51) Int. Cl.
  *G06Q 20/32* (2012.01)
  *G06Q 20/34* (2012.01)
  *G06Q 20/38* (2012.01)
  *G07F 7/02* (2006.01)

(52) U.S. Cl.
  CPC ......... *G06Q 20/322* (2013.01); *G06Q 20/327* (2013.01); *G06Q 20/343* (2013.01); *G06Q 20/387* (2013.01); *G06Q 30/02* (2013.01); *G06Q 30/0207* (2013.01); *G06Q 30/0233* (2013.01); *G06Q 30/0236* (2013.01); *G06Q 30/0238* (2013.01); *G07F 7/02* (2013.01)

(58) Field of Classification Search
  CPC ............. G06Q 20/327; G06Q 30/0207; G06Q 20/387; G06Q 30/0226
  See application file for complete search history.

(56) References Cited

U.S. PATENT DOCUMENTS

| | | | |
|---|---|---|---|
| 5,591,949 A | 1/1997 | Bernstein | |
| 5,650,761 A | 7/1997 | Gomm et al. | |
| 5,727,153 A | 3/1998 | Powell | |
| 5,761,648 A | 6/1998 | Golden et al. | |
| 5,794,210 A | 8/1998 | Goldhaber et al. | |
| 5,857,175 A | 1/1999 | Day et al. | |
| 5,887,271 A | 3/1999 | Powell | |
| 5,915,023 A | 6/1999 | Bernstein | |
| 5,918,211 A | 6/1999 | Sloane | |
| 5,943,624 A | 8/1999 | Fox et al. | |
| 5,970,469 A | 10/1999 | Scroggie et al. | |
| 5,979,757 A | 11/1999 | Tracy et al. | |
| 6,006,265 A | 12/1999 | Rangan et al. | |
| 6,014,635 A | 1/2000 | Harris et al. | |
| 6,055,513 A | 4/2000 | Katz et al. | |
| 6,076,068 A | 6/2000 | DeLapa et al. | |
| 6,088,683 A | 7/2000 | Jalili | |
| 6,169,890 B1 | 1/2001 | Vatanen | |
| 6,223,291 B1 | 4/2001 | Puhl et al. | |
| 6,237,145 B1 | 5/2001 | Narasimhan et al. | |
| 6,282,522 B1 | 8/2001 | Davis et al. | |
| 6,332,126 B1 | 12/2001 | Peirce et al. | |
| 6,353,739 B1 | 3/2002 | Davis | |
| 6,386,450 B1 | 5/2002 | Ogasawara | |
| 6,389,401 B1 | 5/2002 | Kepecs | |
| 6,450,407 B1 | 9/2002 | Freeman et al. | |
| 6,601,040 B1 | 7/2003 | Kolls | |
| 6,647,269 B2 | 11/2003 | Hendrey et al. | |
| 6,711,474 B1 | 3/2004 | Treyz et al. | |
| 6,837,436 B2 | 1/2005 | Swartz et al. | |
| 6,868,391 B1 | 3/2005 | Hultgren | |
| 6,879,965 B2 | 4/2005 | Fung et al. | |
| 6,912,398 B1 | 6/2005 | Domnitz | |
| 6,931,254 B1 | 8/2005 | Egner et al. | |
| 6,996,579 B2 | 2/2006 | Leung et al. | |
| 7,013,286 B1 | 3/2006 | Aggarwal et al. | |
| 7,027,803 B2 | 4/2006 | Dafcik | |
| 7,035,649 B1 | 4/2006 | Chang et al. | |
| 2,096,205 A1 | 8/2006 | Hansen et al. | |
| 7,096,205 B2* | 8/2006 | Hansen ................. | G06Q 20/02 235/375 |
| 7,116,977 B1 | 10/2006 | Moton, Jr. et al. | |
| 7,123,879 B2 | 10/2006 | Koketsu et al. | |
| 7,127,261 B2 | 10/2006 | Van Erlach | |
| 7,127,264 B2 | 10/2006 | Hronek et al. | |
| 7,221,949 B2 | 5/2007 | Clough | |
| 7,239,871 B2 | 7/2007 | Shamp et al. | |
| 7,248,855 B2 | 7/2007 | Joyce et al. | |
| 7,305,365 B1 | 12/2007 | Bhela et al. | |
| 7,506,804 B2 | 3/2009 | Zajkowski et al. | |
| 7,668,754 B1 | 2/2010 | Bridgelall | |
| 7,684,809 B2 | 3/2010 | Niedermeyer | |
| 7,865,414 B2 | 1/2011 | Fung et al. | |
| 7,917,388 B2 | 3/2011 | van der Riet | |
| 8,032,409 B1 | 10/2011 | Mikurak | |
| 8,065,235 B2 | 11/2011 | Narayanaswami et al. | |
| 8,626,130 B2 | 1/2014 | Wesley | |
| 8,783,561 B2 | 7/2014 | Wesley | |
| 8,825,523 B2 | 9/2014 | Gillensen | |
| 9,224,154 B2 | 12/2015 | Wesley | |
| 2001/0001239 A1 | 5/2001 | Stewart | |
| 2001/0005840 A1 | 6/2001 | Verkama | |
| 2001/0007983 A1* | 7/2001 | Lee ........................ | G06Q 20/04 705/69 |
| 2001/0018666 A1* | 8/2001 | Sugiyama ............ | G06Q 20/202 705/14.14 |
| 2001/0051876 A1 | 12/2001 | Seigel et al. | |
| 2002/0029342 A1 | 3/2002 | Keech | |
| 2002/0035539 A1* | 3/2002 | O'Connell .............. | G06Q 20/02 705/39 |
| 2002/0060246 A1 | 5/2002 | Gobburu et al. | |
| 2002/0062249 A1 | 5/2002 | Iannacci | |
| 2002/0077907 A1* | 6/2002 | Ukai ................... | G06Q 30/0211 705/14.13 |
| 2002/0091569 A1* | 7/2002 | Kitaura ................. | G06Q 30/02 705/14.26 |
| 2002/0091571 A1 | 7/2002 | Thomas et al. | |
| 2002/0095333 A1 | 7/2002 | Jokinen et al. | |
| 2002/0101993 A1 | 8/2002 | Eskin | |
| 2002/0115449 A1 | 8/2002 | Allen | |
| 2002/0128908 A1 | 9/2002 | Levin et al. | |
| 2002/0133467 A1 | 9/2002 | Hobson et al. | |
| 2002/0138372 A1 | 9/2002 | Ludtke | |
| 2002/0143655 A1 | 10/2002 | Elston et al. | |
| 2002/0147642 A1 | 10/2002 | Avallone et al. | |
| 2002/0151313 A1 | 10/2002 | Stead | |
| 2002/0165803 A1* | 11/2002 | Iwase ................... | G06Q 10/087 705/28 |
| 2002/0183070 A1 | 12/2002 | Bloebaum et al. | |
| 2003/0004827 A1 | 1/2003 | Wang | |
| 2003/0014330 A1 | 1/2003 | Showghi et al. | |
| 2003/0028483 A1 | 2/2003 | Sanders et al. | |
| 2003/0028518 A1 | 2/2003 | Mankoff | |
| 2003/0036950 A1 | 2/2003 | Nguyen | |
| 2003/0083933 A1 | 5/2003 | McAlear | |
| 2003/0100315 A1 | 5/2003 | Rankin | |
| 2003/0115070 A1 | 6/2003 | Brown et al. | |
| 2003/0120592 A1 | 6/2003 | Ng | |
| 2003/0125958 A1 | 7/2003 | Alpdemir et al. | |
| 2003/0155413 A1 | 8/2003 | Kovesdi et al. | |
| 2003/0162536 A1 | 8/2003 | Panico | |
| 2003/0191709 A1 | 10/2003 | Elston et al. | |
| 2003/0229541 A1 | 12/2003 | Randall et al. | |
| 2003/0233278 A1 | 12/2003 | Marshall | |
| 2003/0233557 A1* | 12/2003 | Zimmerman ........ | G06K 9/00154 713/186 |
| 2004/0002897 A1 | 1/2004 | Vishik | |
| 2004/0023666 A1 | 2/2004 | Moon et al. | |
| 2004/0029570 A1 | 2/2004 | Knorr et al. | |
| 2004/0064406 A1 | 4/2004 | Yates et al. | |
| 2004/0083170 A1 | 4/2004 | Bam et al. | |
| 2004/0098350 A1* | 5/2004 | Labrou ................. | G06Q 20/02 705/64 |
| 2004/0128197 A1 | 7/2004 | Barn et al. | |
| 2004/0215467 A1 | 10/2004 | Coffman et al. | |
| 2004/0227617 A1 | 11/2004 | Vasquez et al. | |
| 2004/0236689 A1* | 11/2004 | Matsuyama ........ | G06Q 20/108 705/42 |
| 2004/0249712 A1* | 12/2004 | Brown ................. | G06Q 30/02 705/14.19 |
| 2004/0260608 A1* | 12/2004 | Lewis ................... | G06Q 20/20 705/14.35 |
| 2005/0021399 A1 | 1/2005 | Postrel | |
| 2005/0021401 A1 | 1/2005 | Postrel | |
| 2005/0071230 A1* | 3/2005 | Mankoff ............ | G06F 17/30011 705/14.15 |
| 2005/0170850 A1 | 8/2005 | Edwards et al. | |

(56) References Cited

U.S. PATENT DOCUMENTS

| | | | |
|---|---|---|---|
| 2005/0187873 A1* | 8/2005 | Labrou | G06Q 20/02 705/40 |
| 2005/0216354 A1 | 9/2005 | Barn et al. | |
| 2005/0251442 A1 | 11/2005 | Ficalora | |
| 2005/0256726 A1 | 11/2005 | Benson et al. | |
| 2006/0000900 A1 | 1/2006 | Fernandes | |
| 2006/0004626 A1* | 1/2006 | Holmen | G06Q 30/02 705/14.26 |
| 2006/0020507 A1 | 1/2006 | Sagey | |
| 2006/0059040 A1 | 3/2006 | Eldred et al. | |
| 2006/0089792 A1 | 4/2006 | Manber et al. | |
| 2006/0091203 A1 | 5/2006 | Bakker et al. | |
| 2006/0099964 A1 | 5/2006 | Barrese et al. | |
| 2006/0099965 A1 | 5/2006 | Aaron | |
| 2006/0105783 A1 | 5/2006 | Giraldin et al. | |
| 2006/0138219 A1 | 6/2006 | Brzezniak et al. | |
| 2006/0143091 A1 | 6/2006 | Yuan et al. | |
| 2006/0169771 A1 | 8/2006 | Brookner | |
| 2006/0171382 A1 | 8/2006 | Mohri et al. | |
| 2006/0178986 A1 | 8/2006 | Giordano et al. | |
| 2006/0194569 A1 | 8/2006 | Hsueh | |
| 2006/0194592 A1 | 8/2006 | Clough | |
| 2006/0195359 A1 | 8/2006 | Robinson et al. | |
| 2006/0248016 A1 | 11/2006 | Ginter et al. | |
| 2007/0050259 A1 | 3/2007 | Wesley | |
| 2007/0087761 A1 | 4/2007 | Anjum et al. | |
| 2007/0150334 A1 | 6/2007 | Bergh et al. | |
| 2007/0156517 A1* | 7/2007 | Kaplan | G06Q 20/342 705/14.33 |
| 2007/0162341 A1 | 7/2007 | McConnell et al. | |
| 2007/0173266 A1 | 7/2007 | Barnes | |
| 2007/0198334 A1 | 8/2007 | Mebruer | |
| 2007/0260521 A1 | 11/2007 | Van Der Riet | |
| 2008/0004888 A1 | 1/2008 | Davis et al. | |
| 2008/0011825 A1* | 1/2008 | Giordano | G06Q 20/04 235/380 |
| 2008/0070572 A1 | 3/2008 | Shkedi | |
| 2008/0074264 A1 | 3/2008 | Sharpe et al. | |
| 2008/0097844 A1 | 4/2008 | Hsu et al. | |
| 2008/0143482 A1 | 6/2008 | Shoarinejad et al. | |
| 2008/0153478 A1 | 6/2008 | Walter | |
| 2008/0243626 A1 | 10/2008 | Stawar et al. | |
| 2008/0270249 A1 | 10/2008 | Rosenbaum et al. | |
| 2008/0306820 A1 | 12/2008 | Passmore | |
| 2009/0088203 A1 | 4/2009 | Havens et al. | |
| 2009/0096628 A1 | 4/2009 | Moscovitch | |
| 2009/0111484 A1 | 4/2009 | Koch et al. | |
| 2009/0177536 A1 | 7/2009 | Alexander et al. | |
| 2009/0177540 A1 | 7/2009 | Quatse | |
| 2009/0265220 A1 | 10/2009 | Bayraktar et al. | |
| 2009/0281895 A1 | 11/2009 | Selinger et al. | |
| 2009/0286553 A1 | 11/2009 | Northway et al. | |
| 2009/0299857 A1 | 12/2009 | Brubaker | |
| 2010/0125495 A1 | 5/2010 | Smith et al. | |
| 2010/0198678 A1 | 8/2010 | Burst et al. | |
| 2011/0029355 A1 | 2/2011 | Hann | |
| 2011/0029362 A1 | 2/2011 | Roeding et al. | |
| 2011/0040625 A1 | 2/2011 | Woodruff et al. | |
| 2011/0047017 A1 | 2/2011 | Lieblang et al. | |
| 2011/0047023 A1 | 2/2011 | Lieblang et al. | |
| 2011/0191237 A1 | 8/2011 | Faith et al. | |
| 2011/0231242 A1 | 9/2011 | Dilling et al. | |
| 2011/0231253 A1 | 9/2011 | Crawford et al. | |
| 2011/0251880 A1 | 10/2011 | Butler et al. | |
| 2012/0022930 A1 | 1/2012 | Brouhard | |
| 2012/0022944 A1 | 1/2012 | Volpi | |
| 2012/0089461 A1 | 4/2012 | Greenspan | |
| 2012/0215610 A1 | 8/2012 | Amaro et al. | |
| 2013/0003575 A1 | 1/2013 | Konishi et al. | |
| 2013/0030901 A1 | 1/2013 | Eichstaedt et al. | |
| 2013/0275217 A1 | 10/2013 | Ramchandani | |
| 2013/0290096 A1 | 10/2013 | Lizotte, III | |
| 2014/0122114 A1 | 5/2014 | Wesley | |
| 2014/0244207 A1 | 8/2014 | Hicks | |
| 2014/0330631 A1 | 11/2014 | Wesley | |
| 2016/0110753 A1 | 4/2016 | Wesley | |

FOREIGN PATENT DOCUMENTS

| | | |
|---|---|---|
| JP | 2003-515228 A | 4/2003 |
| JP | 2003-196529 A | 7/2003 |
| JP | 2005-215846 A | 8/2005 |
| JP | 2006-209280 A | 8/2006 |
| JP | 2008-191905 A | 8/2008 |
| JP | 2009-510610 A | 3/2009 |
| JP | 2009-69985 | 4/2009 |
| JP | 2010-061544 A | 3/2010 |
| JP | 2010-066911 A | 3/2010 |
| JP | 2012-507787 A | 3/2012 |
| WO | WO-98/34203 A1 | 8/1998 |
| WO | WO-99/33034 A1 | 7/1999 |
| WO | WO-02/13552 A2 | 2/2002 |
| WO | WO-02/080121 A2 | 10/2002 |
| WO | WO-2010/062367 A1 | 6/2010 |
| WO | WO-2013/009989 A2 | 1/2013 |
| WO | WO-2013/033540 A1 | 3/2013 |

OTHER PUBLICATIONS

ABC News, "Supermarkets Go High-Tech to Get Shoppers to Spend, TV Carts, Babysitting, Electronic Shopping Buddies and More," Aug. 2006, 2 pages.

CBS News, "Shopping Carts with Brains," Aug. 2003, retrieved from www.CBSNews.com, 1 page.

Chain Drug Review, "Tracking the Impact of Promotional Displays," Technology, Radio-Frequency Identification from Chicago-Based Goliath Solutions, Apr. 2003, 1 page.

Coleman-Lochner, "Handheld Tech Devices Have Future as Commerce Tool," Mar. 2001, retrieved from http://www.accessmylibrary.com/01/05/2009, 3 pages.

Definition of Server from www.soft.com/eValid/Products/Documentation.7/Technical/definitions.html, http://www.google.com/search?sourceid=navclient&aq=t&ie=UTF-8&ris=GGLD,GGLD:2004-30,GGLD:en%q=define%3a+server, downloaded Oct. 14, 2008, 3 pages.

European Retail Digest, "Personal Shopping Assistant Finds Favour in German Retail Market," Sep. 22, 2004, www.accessmylibrary.com, 4 pages.

European Search Report from European Application EP 03777779.4 dated Mar. 29, 2006.

European Office Action from European Application EP 03809623.6 dated Aug. 3, 2006.

European Search Report from European Application EP 05253915.2 dated Sep. 1, 2005.

Ewald, "'Paper or Plastic' is now 'Computer or Cashier'," The Christian Science Monitor, Apr. 2004, www.csmonitor.com, 2 pages.

International Search Report and Written Opinion issued for PCT application PCT/US03/33432 dated Jun. 14, 2004.

International Search Report issued for PCT application PCT/US03/33591 dated Jun. 13, 2005.

International Preliminary Report on Patentability issued for PCT application PCT/US2012/046478 dated Aug. 20, 2014.

Japanese Office Action dated Aug. 2, 2016, which issued in Japanese Application No. 2014-520327, together with English language translation.

Japanese Office Action dated Jul. 26, 2016, which issued in Japanese Application No. 2014-528640, together with English language translation.

Neff, "A Shopping-Cart-ad Plan that Might Actually Work: MediaCart Launches Pilot Program in Northeast as Retailers Express Interest (News)," Feb. 5, 2007, www.accessmylibrary.com, 2 pages.

Press Release, Radical Computing Corp, "Radical Computing Unveils Platform for 1-to-1 In-Store Marketing," Jan. 2008, www.PR.com, 2 pages.

Yashima, Ultimate Selection of 42 must-have iPhone Apps ranging from productivity and photo Apps to entertainment Apps by Editors of Weekly ACSCIII, Weekly ASCII, issued on Jan. 19, 2010, Japan

(56) References Cited

OTHER PUBLICATIONS

ASCII Media Works, Jan. 4, 2010, vol. 22, No. 767, pp. 72-77, together with partial English language translation.
Japanese Notice of Allowance from Japanese Patent Application No. 2014-528640, dated Sep. 12, 2017.
Linkup Co Ltd., "Android App Super Bible," Socym Col., Ltd. Apr. 7, 2011, $1^{st}$ Ed, p. 301.
Japanese Office Action from Japanese Patent Application No. 2014-528640, dated Apr. 4, 2017.
Notification of Transmittal of The International Search Report and The Written Opinion of the International Searching Authority, or the Declaration, for PCT/US07/72757, dated Jan. 28, 2008, 10 pages.
European Office Action for Application No. 12812063.1, dated Nov. 2, 2017, 5 pages.
U.S. Appl. No. 10/646,579, filed Aug. 22, 2003, Barn et al., 48 pages.
U.S. Appl. No. 10/691,459, filed Oct. 22, 2003, Barn 36 pages.
U.S. Appl. No. 60/420,642, filed Oct. 23, 2002, Barn, 18 pages.
U.S. Appl. No. 60/420,643, filed Oct. 23, 2002, Barn, 14 pages.
U.S. Appl. No. 61/445,920, filed Feb. 23, 2011, to which Amaro et al., US20120215610 (U.S. Appl. No. 13/396,536, filed Feb. 14, 2012) claims priority (made of 4 documents, abstract, specification, claims, drawings), 103 pages.

\* cited by examiner

SYSTEM AND METHOD FOR ADMINISTERING A LOYALTY PROGRAM AND PROCESSING PAYMENTS

CROSS-REFERENCE TO RELATED APPLICATIONS

This application is a continuation of U.S. patent application Ser. No. 14/337,100 filed Jul. 21, 2014 entitled "SYSTEM AND METHOD FOR ADMINISTERING A LOYALTY PROGRAM AND PROCESSING PAYMENTS", which is a continuation of U.S. patent application Ser. No. 11/486,707, filed Jul. 14, 2006 (granted Jul. 22, 2014, U.S. Pat. No. 8,783,561) entitled "SYSTEM AND METHOD FOR ADMINISTERING A LOYALTY PROGRAM AND PROCESSING PAYMENTS".

The present invention relates to U.S. patent application Ser. No. 10/646,579, filed Aug. 22, 2003, entitled "SYSTEM AND METHOD OF INTEGRATING LOYALTY/REWARD PROGRAMS WITH PAYMENT IDENTIFICATION SYSTEMS," the disclosure of which is hereby incorporated by reference. The present invention also relates to U.S. patent application Ser. No. 10/877,093, filed Jun. 25, 2004, entitled "A SYSTEM AND METHOD OF ALERTING USERS TO OFFERS USING ELECTRONIC DEVICES," which is a continuation-in-part of U.S. patent application Ser. No. 10/691,459, filed Oct. 22, 2003, entitled "A SYSTEM AND METHOD OF GENERATING, DISTRIBUTING, AND/OR REDEEMING PROMOTIONAL OFFERS USING ELECTRONIC DEVICES," the disclosures of which are hereby incorporated by reference.

TECHNICAL FIELD

The present invention relates to the management, enrollment, and redemption aspects of a loyalty program using a point of sale (POS) terminal, a program management system, and a customer's mobile device.

BACKGROUND OF THE INVENTION

As societies have become more and more mobile, people have found it convenient, and usually mandatory, to carry on their person several items of critical importance. One of these items is a form of payment for goods and services. Another of these items is a form of identity.

Before the concept of government sponsored currency came into vogue, people carried with them different forms of valuable commodities, such as gold, silver, and diamonds. In some societies even beads were popular. With the advent of "official" currency, coins, usually with a ruler's picture imprinted on one surface, were lugged around in sacks or purses. In every transaction, the seller of goods or services needed to make sure of the authenticity of the payment. Usually this was based on verification of the validity of the payment by weighing or measuring, and often depended heavily upon the identification (and known or provable veracity) of the buyer.

Paper money issued by a reliable government solved many of the problems traditionally inherent with commercial transactions. Using such money, the identity of the payor is not critical so long as the authenticity of the currency is validated. For the past few decades this has again been changing, as credit cards, debit cards, stored value cards, and other forms of non-cash payment have taken hold. Concurrent with a change in payment method, there has been an increase in the need for personal identification, both for the payment of goods and services and for the purpose of identification for other purposes. These other purposes include verification of group membership, such as entitlement to discounts, admission to museums, medical benefit entitlements, proof of car insurance, proof of valid licenses, and the like.

Thus, the purse, or now more commonly the wallet, which at first served to lug around valuable and often heavy objects for bartering, now carries several forms of personal papers, usually in the form of plastic cards bearing magnetic identification strips. The wallet now carries different pieces of information and service provider information, such as identification cards, payment cards, loyalty cards, affinity cards, drivers licenses, coupons, and more. Key chains are also being used to carry tags containing these pieces of information.

Each of these cards enables specific services. For example, a credit card serves the function of providing the user credit for a purchase but does not serve the function of allowing the card to be used for debit purposes or for group identification, or for indicating that the holder has a valid license, or has valid insurance. Moreover, the information that is stored on these cards is permanent and cannot easily be changed at the will of either the issuer or the borrower. The wallet has again grown heavier as the number of identification cards has increased.

Many stores also have their own affinity, loyalty or rewards programs, such as a Stop & Shop card, a CVS pharmacy card or a AAA card, which are programs operationally separate from the payment cards. This offers the additional inconvenience of needing to carry additional cards and requires a user to swipe two different cards at a point of sale; one card for discount/rewards/identification, and one card for payment, and perhaps a third card just to enter the facility. Other stores have started to issue stored value cards for purchases, gifts, promotions, and returns. One use of such stored value cards occurs when a merchant records one or more transactions on a customer's card and then, after a certain number of transactions (or transaction amounts) have been entered, the customer is awarded a gift, or a discount, or some other item of value. These cards are being used to build customer loyalty and attract new customers.

Given a choice of similar providers, consumers tend to patronize the merchant that provides the consumer more value for the same price, or the same value at a lower price. To influence a consumer's choice of providers, merchants often provide promotions, such as coupons, for goods such as groceries, consumer electronics, clothing, and other items that may be purchased in person, over the phone, or electronically. In this context, a coupon is a promotion used as a tool by merchants to encourage sales and/or loyalty, usually by lowering the price in some manner. For example, a coupon could be used for a discount on the product, to give the consumer a larger quantity (for example, 2 for 1) of a product or service, or a discount on a related product or future purchase. A coupon could also be used to credit purchases made by one person against a certain account. Thus, a school could get credits (money or otherwise) for purchases made by any one of a number of people having an affinity toward the school (affinity groups). The possibilities for coupon usage are essentially unlimited.

Coupons and other promotions are often used by merchants as marketing tools designed and developed to encourage a change in purchase behavior, retain valued customers and to induce repeat purchases. Traditional promotions have been paper and/or plastic card-based, and usually have a cash or material purchase value, such as prepaid gift cards. Rather than being directed toward a single product, the promotions may be an incentive to buy accessories associated with a particular item, or promotions may even be offers to sell. Overall, promotions serve to attract consumers to a store or to a particular product or brand in a store, as well as to bring attention to new products and keep track of an individual consumer's buying habits.

BRIEF SUMMARY OF THE INVENTION

The present invention is directed to a system and method for administering a customer loyalty program and processing payments using a point of sale (POS) terminal and a processing platform. Embodiments of the invention allow a customer to both pay for a transaction and participate in a loyalty program using a single payment device at a POS terminal. In one embodiment, the customer may use a credit card not associated with the merchant to pay for goods at a POS terminal. The POS terminal may capture swipe data from the credit card. The POS terminal may then transmit transaction information such as the captured payment device identification information and a total amount due for the transaction to the processing platform. In some embodiments, the processing platform is located at a remote location from the point of sale terminal and one processing platform may communicate with a number of POS terminals. The processing platform may search a database of stored customer records to locate a customer record associated with the transmitted payment device identification information. In addition to payment device identification information, the customer record may contain mobile device identification information and loyalty program data. In another embodiment the POS terminal may capture mobile device identification in addition to or in alternative to capturing the payment device identification information discussed above. The system may then locate a customer record based on the mobile device identification information.

When the processing platform locates a customer record containing the transmitted payment device identification information and/or mobile device identification information, the processing platform may process loyalty program data associated with the located customer record such as accrued discounts and apply any discounts to the amount due to create an adjusted amount due. In some embodiments, a coupon server within the processing platform may perform this processing. The processing platform may then transmit this adjusted amount due to a third party payment processor. Upon confirmation from the third party payment processor, the processing platform may transmit a confirmation message to the POS terminal. In another embodiment, the adjusted amount due may be transmitted back to the POS terminal for payment processing. The POS terminal may then accept payment in any form including cash, check, credit card, and/or the like.

In one embodiment, if the processing platform fails to locate the transmitted payment device information and/or mobile device identification information in the database of customer records, the processing platform may send a message to the POS terminal informing the terminal. The POS terminal may then prompt the customer to join the loyalty program. In one embodiment, the customer could then join the program by inputting information into the POS terminal including mobile device identification information. The customer may enter this information directly into the terminal or may orally relay the information to the merchant to input.

The POS terminal may then transmit that information to the processing platform where the processing platform creates a new customer record in the loyalty program's customer records database. The processing platform may then proceed processing the transaction, creating an adjusted amount due by applying any discounts applicable to new loyalty program members. The POS terminal may print a receipt for the new member providing details about the program as well as opt-out information. The processing platform may similarly send a welcome message to the new member's mobile device using the stored mobile device identification information containing details of the program and opt-out information.

Upon completion of the transaction, the POS terminal may print a receipt for the customer having normal information contained in a receipt, as well as a promotional message. The promotional message may inform program members of upcoming program discounts or may encourage non-members to join the program. The message may contain instructions on how to enroll in the loyalty program at a later time. Upon completion of the transaction at the processing platform, the processing platform may use the mobile identification information stored in the located customer record to transmit a promotional message to the customer's mobile device. This message, for example, may consist of an SMS message transmitted to the customer's mobile phone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURES. It is to be expressly understood, however, that each of the FIGURES is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
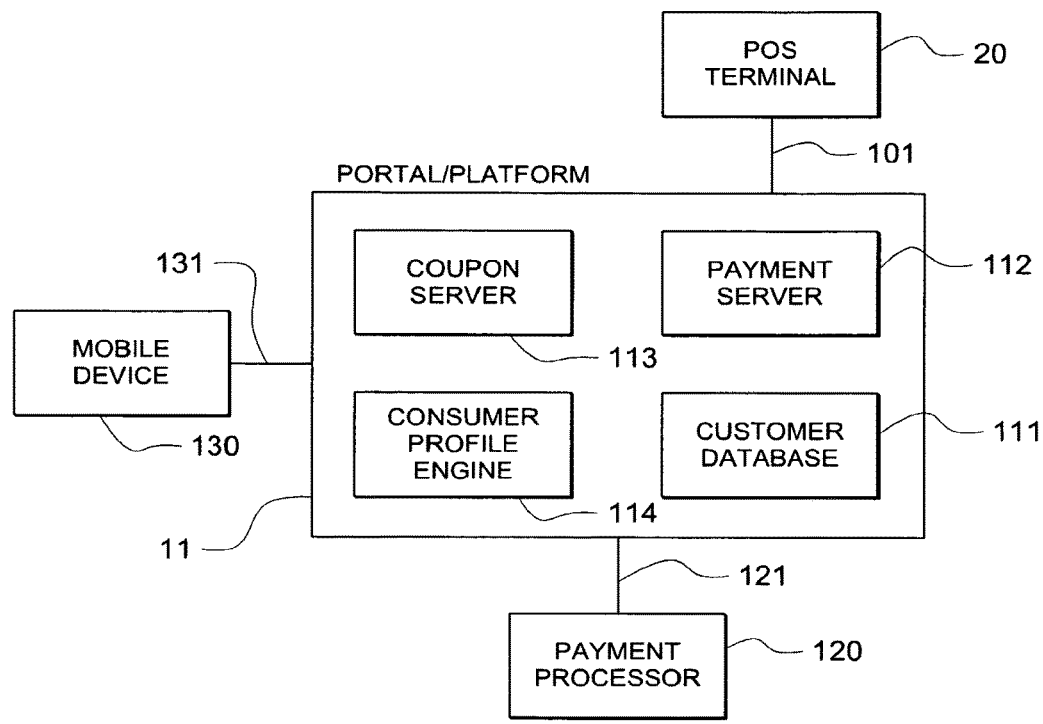
FIG. 1 is an overview of one embodiment of a payment/loyalty program architecture.

FIG. 1 illustrates one embodiment of system 10 for administering a loyalty program and processing customer payments for transactions. The system contains at least one point of sale (POS) terminal, such as terminal 20. The POS terminal is connected to processing platform 11 through a communications link, such as link 101. Communications link 101 may utilize any communications hardware and methods known in the art capable of transmitting data and link 101 may include phone lines, T1 lines, ISDN lines, or wireless links such as wireless links using the IEEE 802.11 standard. In some embodiments, communications link 101 may comprise multiple communications system and protocols. For example, in one embodiment, the POS terminal may connect over an Ethernet cable to a cable modem that then communicates over a fiber-optic cable with a server that then connects over a different fiber optic line to another server that then connects over a T1 line to the processing platform 11.

Processing platform 11 in some embodiments may be physically located in a remote location from POS terminal 20. The processing platform contains, for example, a database of customer records 111. Processing platform 11 may administer one or more loyalty programs and may contain different customer database 111 for each loyalty program. The customer record may contain mobile device identification information, payment device identification information, and loyalty program data for the customer. In some embodiments, the customer's mobile device identification may be a phone number for a mobile phone, and the customer's payment device identification may be a credit card number. One customer record may contain payment device identification information for a plurality of payment devices. In some embodiments, the database will only allow a unique mobile device identification to be associated with a single customer record. The customer database may be stored on a server using database storage techniques known to those skilled in the art.

Processing platform 11 may contain software and hardware to perform additional functionality. The processing platform may, for example, contain payment server 112 to process payments and communicate with the payment processor and coupon server 113 to generate and distribute promotional offers. Coupon server functionality is described in the above-identified application entitled "SYSTEM AND METHOD OF INTEGRATING LOYALTY/REWARD PROGRAMS WITH PAYMENT IDENTIFICATION SYSTEMS." The processing platform may additionally contain a customer profile engine 114. Payment server 112, coupon server 113, and customer profile engine 114 may be implemented in software using any programming technique known to those skilled in the art such as XML, C++, or SQL. The software components may be located on a single physical server in some embodiments or may be located on different servers to increase capacity and efficiency as is known in the art.

Processing platform 11 may connect to third party payment processor 120 through communications link 121. Communications link 121 may be implemented using any communications technique known in the art and may comprise multiple physical links, as discussed above with respect to link 101. Third party payment processor 120 accepts payment device information in any standard format and transmits confirmation in any standard format after processing the payment. In this context, payment device information may include minimal information required to identify the payment device, such as a credit card number and expiration date, or could include "swipe data," which is known to those skilled in the art.

Processing platform 11 may connect to the customer's mobile device, such as to device 130 over communications link 131. Communications link 131 may comprise a wireless communications link using a standard wireless communications technique, such as Bluetooth, IEEE 802.11, cdma2000, GPRS, or any other wireless standard known to those in the art. In one embodiment, the customer's mobile device 130 is a mobile telephone identified by a telephone number and capable of receiver SMS messages. In some embodiments, Processing platform 11 establishes temporary communication links with a plurality of mobile devices 130 simultaneously.

Figure 2:
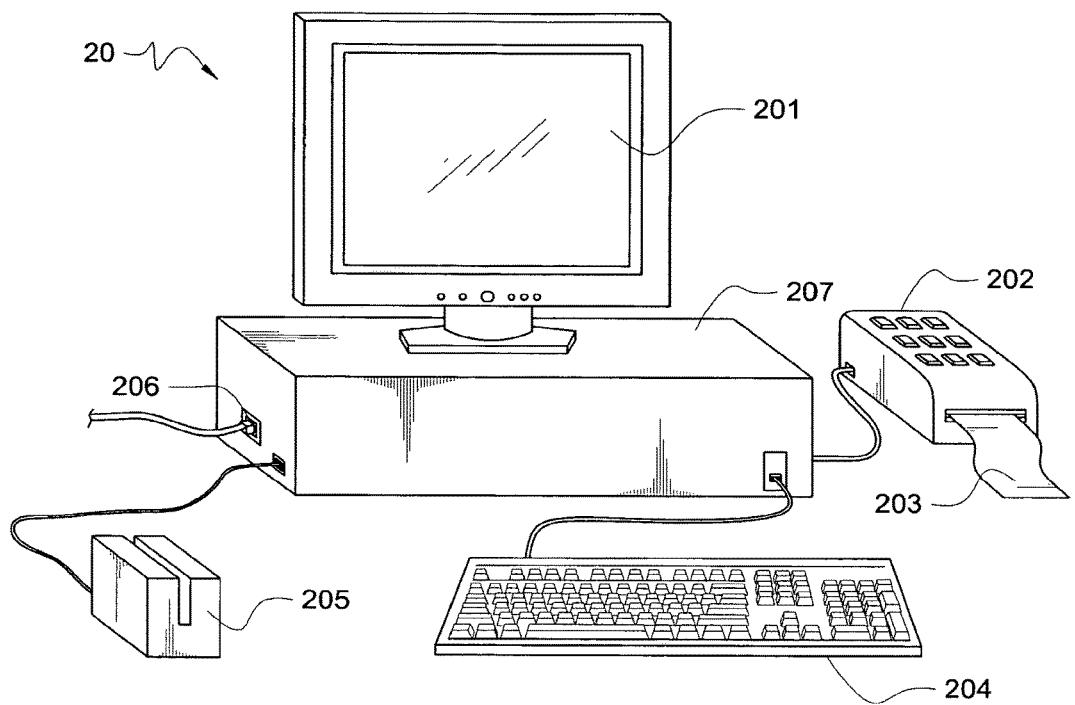
FIG. 2 illustrates a point of sale (POS) terminal for use in one embodiment.

FIG. 2 illustrates a POS terminal, such as terminal 20, which contains display 201 capable of displaying messages to a merchant or customer. POS terminal 20 may also contain printer 202 capable of printing out receipt 203. POS terminal 20 may further contain a data entry device, such as keyboard 204 and a payment device reader, such as reader 205. The data entry device may be a keypad (as shown) or a touch screen integrated with display 201 or any other data entry device known to those skilled in the art. Payment device reader 205 can, for example, read information stored on the magnetic strip of a payment card, such as a credit card or debit card. Payment device reader 205 may also obtain payment information through any other method known in the art, such as, for example, reading an RFID tag or a near-field communication (NFC). In some embodiments, POS terminal 20 does not contain a payment device reader 205, but rather accepts payment device identification information through a data entry device, such as keyboard 204. In some embodiments, POS terminal 20 may also be capable of capturing mobile device identification information in addition and/or as an alternative to payment device information. For example, a data entry device such as keyboard 204 may be used to enter mobile device identification information. As another example, payment device reader 205 may be used to capture mobile device identification information through such methods as RFID, NFC, and/or the like. It should be understood that POS terminal 20 may accept mobile device identification information in addition to or as an alternative to other payment device identification information. Where the mobile device is used by POS terminal 20 to effectuate payment, the mobile device is functioning as a payment device and the mobile device identification information constitutes payment device identification information.

POS terminal 20 also contains hardware for communicating with portal 11 over a communications link 101 (FIG. 1), as discussed above. POS terminal 20 also contains processor 207 capable of running software written in any programming language known to those skilled in the art. Processor 207 may in some embodiments be capable of running software written in a language specifically designed for payment applications, such as SoftPay® by Verifone®. In some embodiments one or more POS terminals may be a Verifone® Omni® 3750 terminal.

Figure 3A:
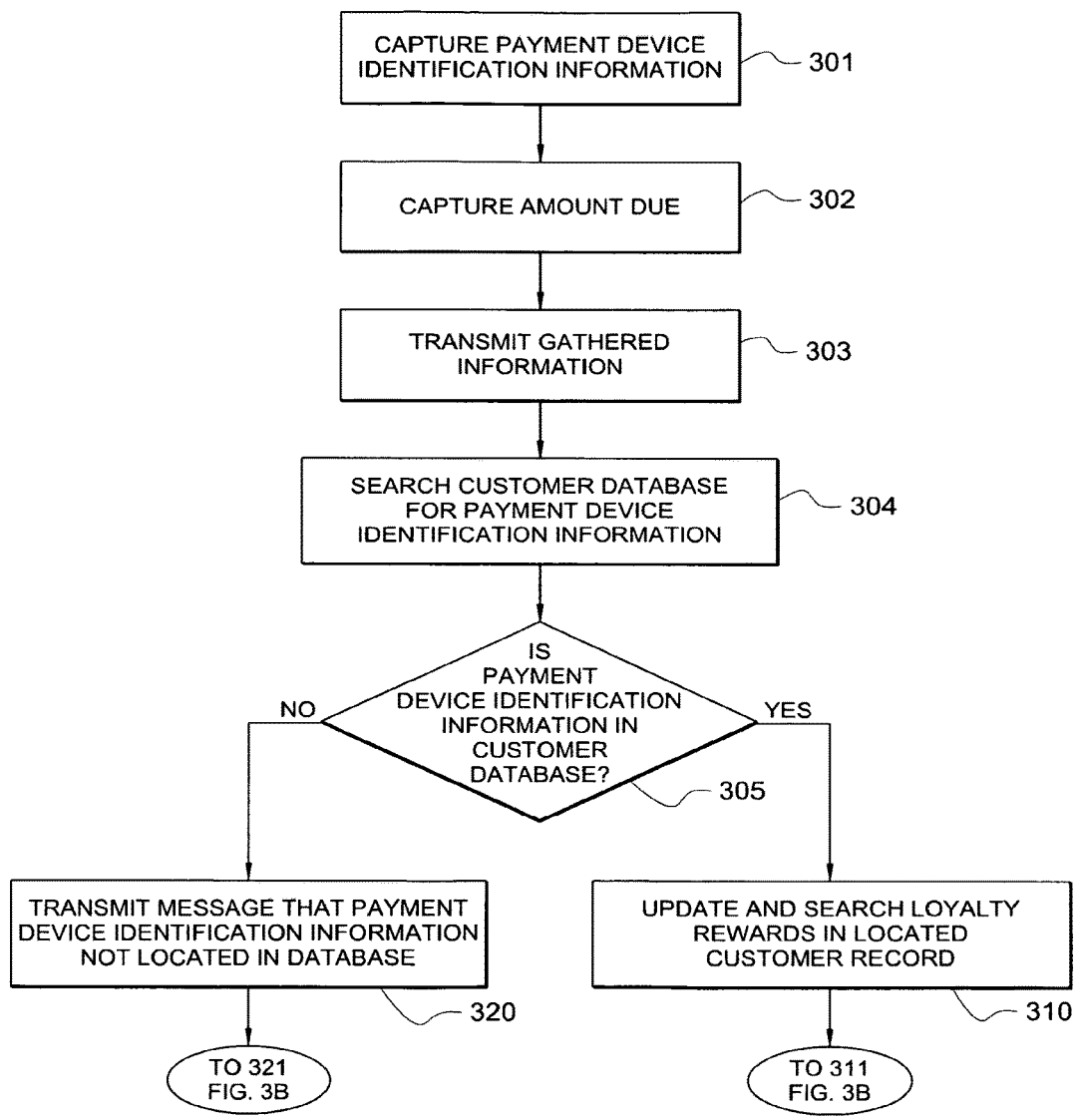
FIGS. 3A, 3B, and 3C are flow charts showing use of the system in one embodiment.
Figure 3B:
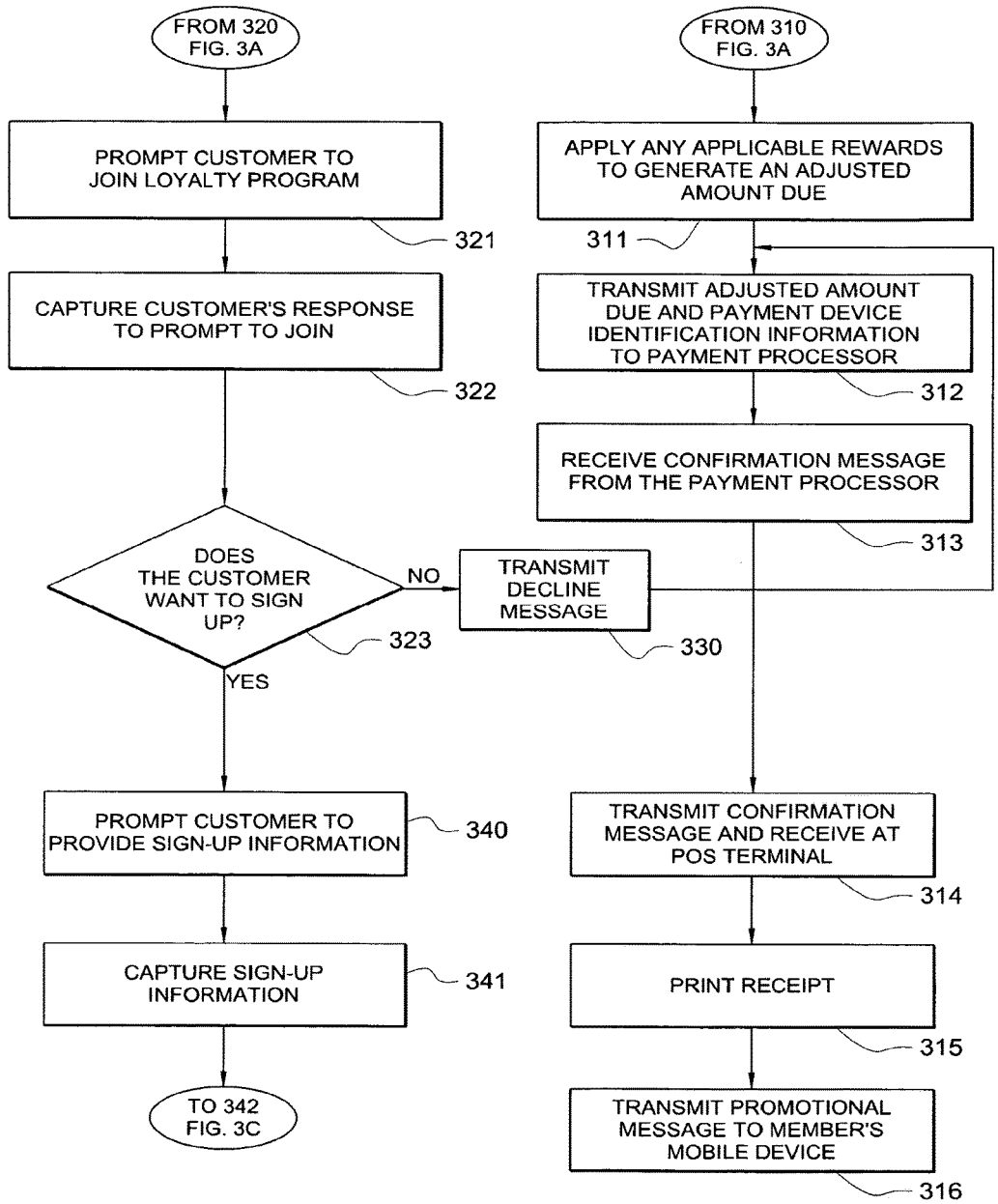
Figure 3C:
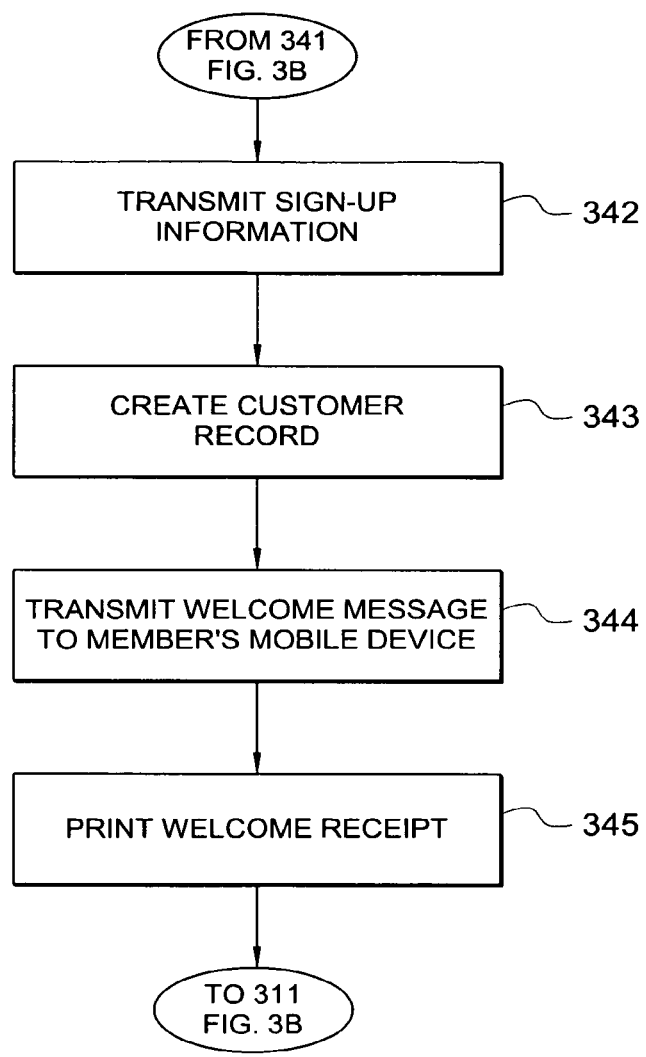

FIGS. 3A, 3B and 3C show flow charts showing use of the system in one embodiment. In some embodiments, the steps may be performed using the exemplary system of FIG. 1 and POS terminal 20 shown in FIG. 2. The steps shown in FIGS. 3A, 3B and 3C are shown in a particular order, but as one skilled in the art would understand, the steps may be performed in other orders and additional (or fewer) steps can be utilized to achieve the desired result.

As shown in FIG. 3A, in process 301, payment device identification information is captured. In one embodiment, the customer may place his or her payment device in proximity of a payment device reader 205 (FIG. 2), which may be part of a POS terminal 20. A merchant may also take the payment device in the form of a payment card from the customer and swipe the card through a payment device reader 205. Payment device reader 205 may capture card information stored on a magnetic strip on a payment card and obtain "swipe information" as is well known in the art. In other embodiments, the customer or merchant may enter payment device identification information using data entry device 204. In some embodiments, the merchant may swipe a payment device and then the customer may enter additional payment device information using a data entry device 204. In another embodiment, payment device reader 205 may obtain payment device information using NFC or RFID technology and/or the like. In these embodiments, the payment device may not be a traditional card, but instead may be any object known to those skilled in the art to contain user identification information, In some situations, the customer may simply place the payment device in proximity to payment device reader 205 to allow the payment device reader to capture the payment device identification information. In another embodiment, the customer's mobile device may function as a payment device. That embodiment is discussed in more detail, below.

In process 302, an amount due for the transaction is captured. Process 302 may occur before, after, or simultaneous with process 301. In one embodiment, the merchant may enter an amount due using data entry device 204. In another embodiment, an amount due may be generated by separate electronic equipment and transmitted electronically to the POS terminal. A cash register may be employed to enter items ordered and generate an amount due. The cash register may then transmit that information electronically to the POS terminal. In another embodiment, the POS terminal may contain such cash register functionality and may generate an amount due after the merchant or customer has entered the items ordered.

In process 303, the information gathered in processes 301 and 302 is transmitted to the location of the customer database. In one embodiment shown in FIG. 1, the database 111 is located within processing platform 11. The information transmitted may include an amount due and payment device (for example, credit card) information. Additional information such as information on the specific items purchased by the customer, date and time information, the name of the merchant, etc. can be transmitted, if desired. Merchant information is important if the customer database is co-located on the same processing platform as customer databases for loyalty programs for other merchants. In some embodiments, the merchant or customer may push a button or enter information into data entry device 204 to cause the system to transmit the gathered information.

In process 304, the customer database is searched to locate the transmitted payment device identification information. Processing platform 11 receives the transmitted information and identifies the specific customer database to be searched. This is done by identifying the merchant through the transmitted information. The information may then be fed to an engine, such as customer profile engine 114, to conduct a search of the selected customer database in accordance with process 304.

Process 304 determines if the customer's payment device information is located in a customer record. If so, the system may continue processing with process 310. If the payment device information is not located, the system may continue with process 320, in which a message will be transmitted to the POS terminal indicating that the payment identification information was not located and allowing the POS terminal to prompt the customer to join the merchant's loyalty program. In some embodiments, the merchant may not wish to prompt its customers to sign up for the loyalty program if they are not already a member, and therefore may not wish to slow down the payment process by performing process 320 et seq. In this case, the system may continue processing with process 312 when the customer's payment identification information is not located.

In process 310, the located customer record is updated to record the current transaction and searched for applicable loyalty rewards. Coupon server 113 (FIG. 1) may receive information about the current transaction as well as information about previous transactions contained in the customer record and determine if the customer is eligible for any loyalty rewards. If the customer is eligible for a reward, the system will enter that reward in the customer record. Such reward could be based on previous customer activity, current purchase items, customer profile information, or any other criteria. A reward may also be entered into the customer's account as a result of the customer signing up for the loyalty program. The customer record may also contain a listing of rewards previously acquired by the customer and the system may search the customer record for such rewards that may be redeemed with the current purchase.

As shown in FIG. 3B, in process 311, if any loyalty rewards are to be applied to the current transaction, an adjusted amount due is generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

In process 312, the adjusted amount due and payment device information is transmitted to payment processor 120 (FIG. 1) over communications link 121. The payment device information may be swipe information or any other information accepted by payment processors as identifying the specific payment device. As is known in the art, payment processors charge less to process a transaction where swipe information is provided. In some embodiments, the information is transmitted in a standard format specified by the payment processor and known to those skilled in art.

In process 313, a confirmation message is received from payment processor 120. This confirmation message may be received over communications link 121. The confirmation message may contain routing information specifically identifying the transaction confirmed and the total amount charged.

In process 314, a confirmation message is sent and received at POS terminal 20. The confirmation message may contain routing information specifically identifying the transaction confirmed and the total amount. The confirmation message may further contain information about any loyalty rewards applied. Alternatively, since POS terminal 20 knows the original amount due as transmitted, if the confirmation message contains the actual amount charged (the adjusted amount due), the POS terminal may calculate the discount applied.

In process 315, receipt 203 is printed for the customer. In some embodiments, the receipt 203 is printed at POS terminal 20 using printer 202. In addition to normal information that would be contained on a sale receipt as those skilled in the art would understand, the receipt may contain a promotional message about the loyalty program. For example, the receipt may contain text telling the customer how many purchases he or she is away from earning another loyalty reward. In another example, the receipt may contain text informing the consumer of future promotions. The receipt may also in some embodiments identify the amount of any discount applied. If the receipt is for a transaction involving a customer who is not a member of the loyalty program, the receipt may contain a message encouraging the customer to join the loyalty program. For example, the receipt may contain text explaining discounts that would have been applied if the customer was a member of the program. This promotional message could also contain instructions on how to join the loyalty program, including providing a phone number or web address for the customer to call to join the program. A system and process for enrolling customers in a loyalty program through a website or phone call are described in the above-identified application entitled "SYSTEM AND METHOD OF INTEGRATING LOYALTY/REWARD PROGRAMS WITH PAYMENT IDENTIFICATION INFORMATION."

In process 316, a promotional message is transmitted to the member's mobile device. If the search of payment device identification information in process 304 successfully located a customer record, processing platform 11 may transmit a promotional message to the customer's mobile device 130 using the mobile device identification information stored in the customer's customer record over communications link 131. The time of performance of process 316 is not linked to the time of performance of any other steps, except that it must be performed after process 304 because it relies on information located in process 304. Processing platform 11 may send an SMS message to the customer's mobile phone number using techniques and hardware known to those skilled in the art. The promotional message may or may not contain the information traditionally found on a receipt such as the amount due and the cost of items, and may contain information about the promotion received and the customer's current status in the loyalty program. The promotional message may also inform the customer about additional loyalty program options.

In process 320 (FIG. 3A), a message is transmitted indicating that the payment device information was not located in the customer database. This message is sent from processing platform 11 over communications link 101 to POS terminal 20. The message may be in any format understood by the POS terminal and may simply reference the specific transaction and contain an indicator that the payment device identification information was not located in the customer database.

As shown in FIG. 3B, in process 321, a message is displayed asking the customer if he or she would like to join the loyalty program. In one embodiment, this message may be displayed on display 201 of POS terminal 20 (FIG. 2). The display may be visible to the merchant and not the customer and the merchant may orally ask the customer if he or she would like to join the loyalty program after the merchant sees the offer to join displayed on display 201. In another embodiment, the customer may view the offer directly.

In process 322, the customer's response to the prompt to join is captured. In one embodiment, the customer indicates his or her choice by selecting a choice using a data entry device at POS terminal 20 (FIG. 2) by depressing a key on a keypad or touching a portion of a touch screen display displaying his options. In another embodiment, the customer may orally announce his choice and the merchant may enter the choice using data entry device 204 at POS terminal 20.

Process 323 determines if the customer chooses to join the program. If the customer chooses to join the program, processing may continue with process 340, and if the customer chooses not to join the program, processing may continue with process 330. As discussed above, in some embodiments the merchant may elect not to prompt customers to join, in which case processes 320 and 321 may not occur. In another embodiment, a message may still be transmitted in process 320, but the POS terminal may automatically continue processing with process 330, bypassing processes 321, 322, and 323.

In process 330, a decline message is transmitted indicating that enrollment information will not be transmitted and processing of the transaction may continue. In some embodiments, this message is sent from POS terminal 20 over communications link 101 to processing platform 11 (FIG. 1). The message may be in any format understood by processing platform 11. The message may simply reference the specific transaction and contain an indicator that enrollment information will not follow and processing of the transaction should continue. Processing may then continue with process 312.

In process 340, the customer is prompted to provide sign-up information. The sign-up information requested may be any information required for a complete customer record. Such information may include basic identification information such as a name and address as well as contact information such as an e-mail address or mobile device identification information, such as a phone number for a mobile phone. Information previously obtained in process 301 from the payment device may be displayed for the customer to confirm the accuracy of that information. The customer may also be asked if he or she would like to associate other payment devices with the account in which case the system may capture information from those payment devices as described in process 301. The customer may be prompted by messages displayed on display 201 of POS terminal 20 (FIG. 2). The display may be visible to the merchant and not the customer and the merchant may orally ask the customer for the information requested or the customer may view the prompts directly.

In process 341, the customer's sign up information is captured. In one embodiment, the customer enters sign-up information using a data entry device 204 at POS terminal 20 (FIG. 2) by depressing keys on a keypad or touching a portion of a touch screen display displaying options. In another embodiment, the customer may verbally relay information to the merchant and the merchant may enter the information using data entry device 204 at POS terminal 20. The entered information may be displayed for the user allowing the user to confirm the information is correct before processing continues. It may be desirable for customers to be able to sign up for the merchant's loyalty program without
first initiating a transaction and thus the merchant or customer may be able to initiate the sign up process by selecting an option from a main menu. In such a case, the sign-up process may begin with process 341.

As shown in FIG. 3C, in process 342, sign-up information is transmitted. The information is transmitted in a message sent from POS terminal 20 over communications link 101 to processing platform 11. The message may be in any format understood by processing platform 11. The message may reference the specific transaction and contain the sign-up information provided by the customer. The message may or may not contain information captured from the customer's payment card and previously transmitted in process 303.

In process 343, a customer record is created in the merchant's loyalty program's customer records database 111. The customer record is created at a processing platform 11. Coupon server 113 or another processing entity within processing platform 11 may be queried to identify any loyalty rewards applicable to enrolling members of the merchant's loyalty program. Any located loyalty rewards may then be placed in the customer record to be applied to the current transaction. In addition to use in the processes described herein, the customer record may be used in other facets of a loyalty program. Such other facets may include the transmitting of messages containing digital coupons to a customer's mobile device based on a customer's profile and not associated with any particular transaction. Such a system and method are described in the above referenced application entitled "A SYSTEM AND METHOD OF ALERTING USERS TO OFFERS USING ELECTRONIC DEVICES." After creating a customer record in process 344, processing of the transaction may immediately continue with process 311, while processes 344 and 345 may occur simultaneously, prior to, or subsequent to the transaction processing beginning with process 311.

In process 344, a welcome message is transmitted to the customer's mobile device. The message may be sent using the mobile device identification information provided by the customer in process 341 and stored in the customer record in process 343. The welcome message may be sent as an SMS message to the customer's mobile phone using the customer's mobile phone number stored in the customer's customer record as mobile device identification information. The welcome message may include information about the loyalty program, as well as promotional messages. Possible promotional messages are described above in the discussion of process 316. In some embodiments, the welcome message may also contain instructions for opting out of receiving future messages on the mobile device. In some embodiments, the welcome message may also contain a request that the customer acknowledge the message in some fashion. Such an acknowledgment may be used to confirm that the customer provided valid and accurate mobile device identification information. In some embodiments, a customer may not be deemed a valid member of the loyalty program until the customer acknowledges the welcome message. The customer may acknowledge the welcome message in some embodiments simply by replying to the welcome message using the same communications protocol used to send the message. Other methods of acknowledging may include calling an activation number or visiting a specific website and signing in.

In process 345, a welcome receipt is printed for the customer. In some embodiments, the receipt may be printed on printer 202 at POS terminal 20 (FIG. 2). The receipt may be printed immediately after the customer enters his contact information or the receipt may not be printed until POS terminal 20 receives a confirmation message from processing platform 11 that the customer information was successfully entered into the customer database in process 343. The welcome receipt may contain program rules including privacy information, instructions for opting out of receiving future messages at the mobile device, instructions for quitting the program, as well as promotional messages.

Figure 4A:
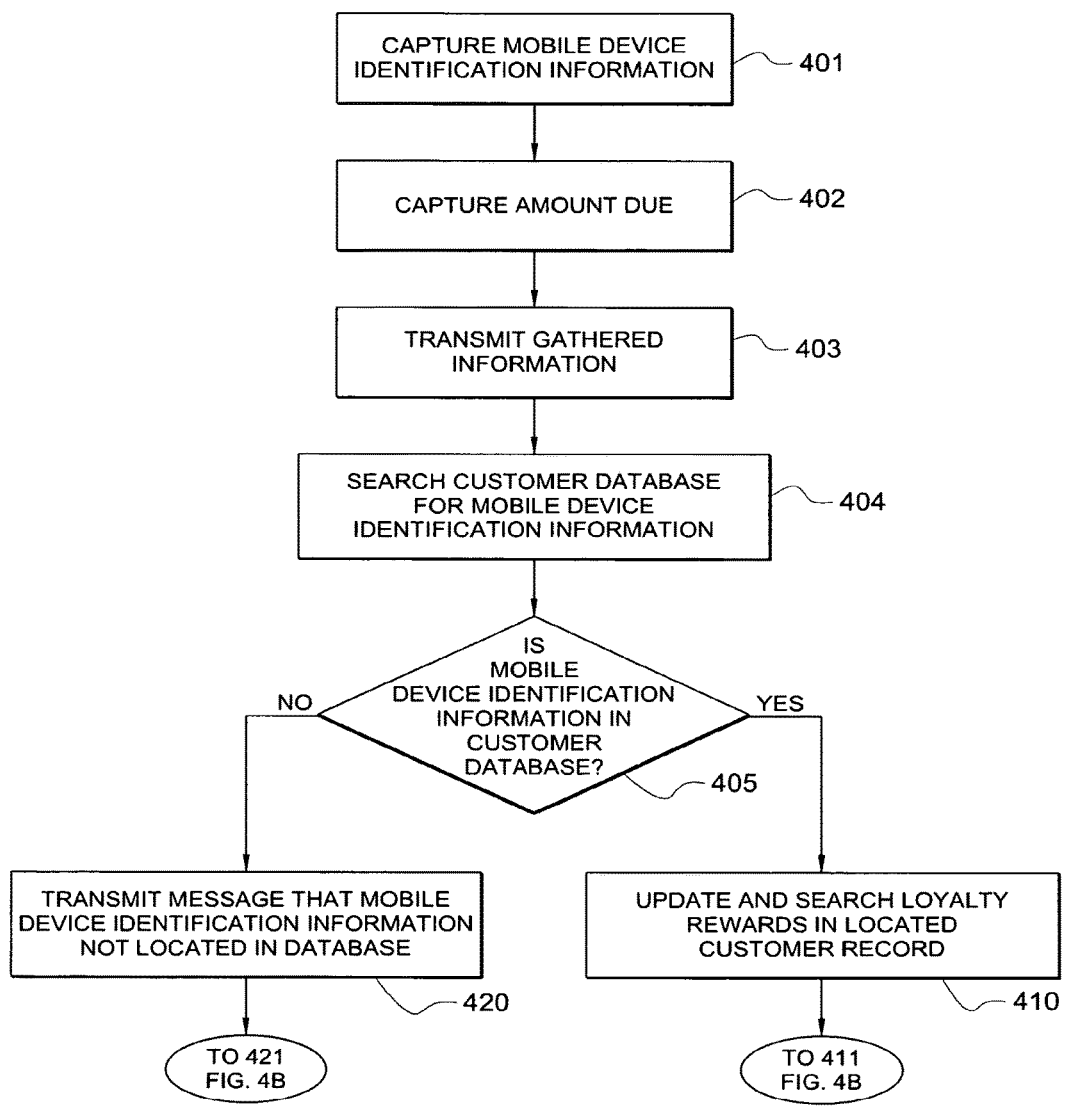
FIGS. 4A, 4B, and 4C are flow charts showing use of the system in another embodiment.
Figure 4B:
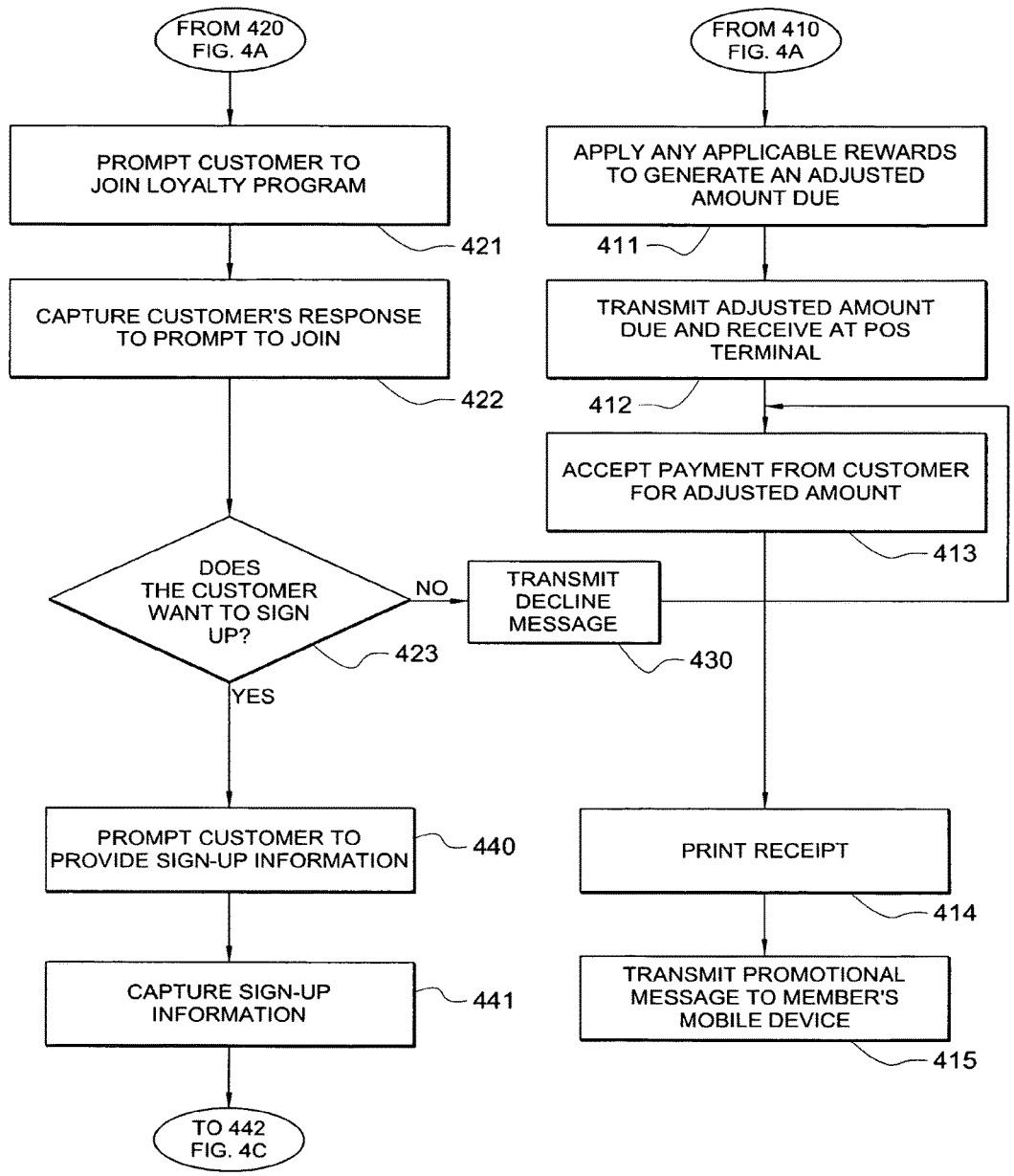
Figure 4C:
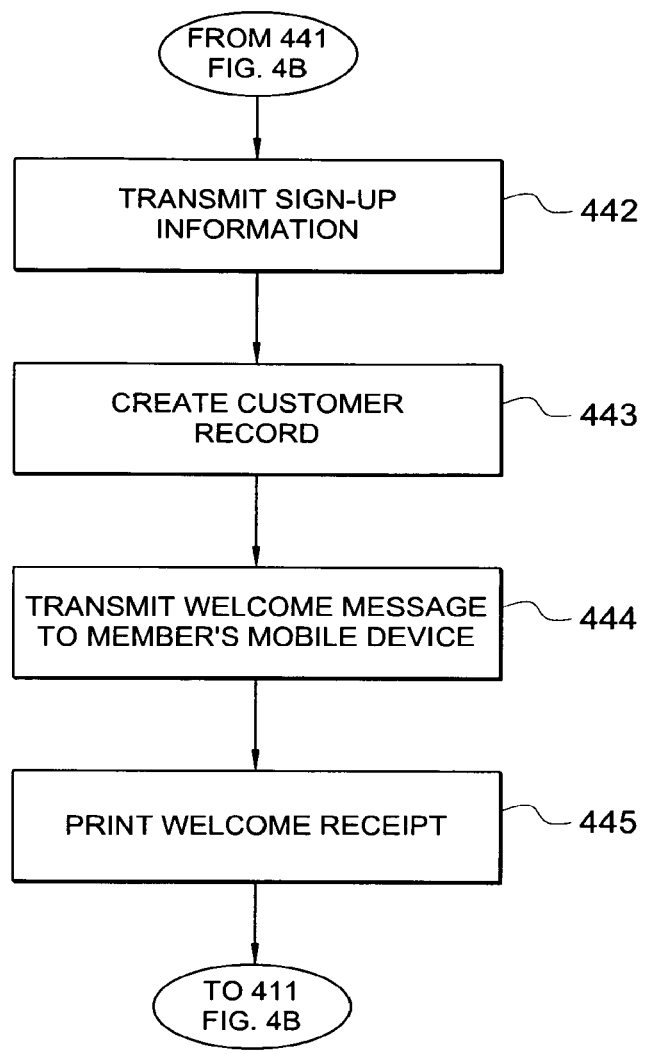

FIGS. 4A, 4B and 4C show flow charts showing use of the system in another embodiment. In some embodiments, the steps may be performed using the exemplary system of FIG. 1 and POS terminal 20 shown in FIG. 2. The steps shown in FIGS. 4A, 4B and 4C are shown in a particular order, but as one skilled in the art would understand, the steps may be performed in other orders and additional (or fewer) steps can be utilized to achieve the desired result. Many of the processes shown in FIGS. 4A, 4B, and 4C may operate in the same or similar to the processes of FIGS. 3A, 3B, and 3C. While the processes of FIGS. 3A, 3B, and 3C rely on the customer using a payment device uniquely associated with the customer, the processes of FIGS. 4A, 4B, and 4C identify the customer based on the customer's mobile device identification information and thus allow the customer to pay in any manner, including manners not uniquely identifying the users, such as paying cash.

As shown in FIG. 4A, in process 401, mobile device identification information is captured. In one embodiment, the customer may place his or her mobile device in proximity of a payment device reader 205 (FIG. 2), which may be part of a POS terminal 20. In one embodiment, payment device reader 205 may obtain mobile device information using NFC or RFID technology and/or the like. In some situations, the customer may simply place the payment device in proximity to payment device reader 205 to allow the payment device reader to capture the payment device identification information. In another embodiment, the customer may key mobile device identification information into POS terminal 20. The customer may enter the mobile device identification information into a device such as keypad 204 (FIG. 2) or display 201 (FIG. 2) may function as a touch-screen display allowing the customer to key in mobile device identification information. Similarly, the customer may verbally communication mobile device identification information to the merchant who may then enter the information into POS terminal 20, in some embodiments using a device such as keypad 204 or display 201. In some embodiments, the mobile device identification information may be the phone number assigned to a customer's cellular phone. In other embodiments, the mobile device identification may be another value that identifies the users and/or specific mobile device such as an MSID, ESN, and/or the like.

In some embodiments, both mobile device identification information and payment device identification information may be captured in process 401. The payment device identification information may be transmitting in process 403 or may simply be saved at POS terminal 20 (FIG. 2) for processing of payment in process 413. The mobile device identification information may be captured through the process described in process 302 (FIG. 3A). Additionally, the mobile device may store payment device identification information such that both mobile device identification information and payment device identification information are received by POS terminal 20 through such methods as RFID, NFC, and/or the like.

In process 402, an amount due for the transaction is captured. Process 402 may occur before, after, or simultaneous with process 401. In one embodiment, the merchant may enter an amount due using data entry device 204. In another embodiment, an amount due may be generated by separate electronic equipment and transmitted electronically to the POS terminal. A cash register may be employed to enter items ordered and generate an amount due. The cash register may then transmit that information electronically to the POS terminal. In another embodiment, the POS terminal may contain such cash register functionality and may generate an amount due after the merchant or customer has entered the items ordered.

In process 403, the information gathered in processes 401 and 402 is transmitted to the location of the customer database. In one embodiment shown in FIG. 1, the database 111 is located within processing platform 11. The information transmitted may include an amount due and mobile device identification information. Additional information such as payment device identification information, information on the specific items purchased by the customer, date and time information, the name of the merchant, etc. can be transmitted, if desired. Merchant information is important if the customer database is co-located on the same processing platform as customer databases for loyalty programs for other merchants. In some embodiments, the merchant or customer may push a button or enter information into data entry device 204 to cause the system to transmit the gathered information.

In process 404, the customer database is searched to locate the transmitted mobile device identification information. Processing platform 11 receives the transmitted information and identifies the specific customer database to be searched. This is done by identifying the merchant through the transmitted information. The information may then be fed to an engine, such as customer profile engine 114, to conduct a search of the selected customer database in accordance with process 404.

Process 404 determines if the customer's mobile device information is located in a customer record. If so, the system may continue processing with process 410. If the payment device information is not located, the system may continue with process 420, in which a message will be transmitted to the POS terminal indicating that the payment identification information was not located and allowing the POS terminal to prompt the customer to join the merchant's loyalty program. In some embodiments, the merchant may not wish to prompt its customers to sign up for the loyalty program if they are not already a member, and therefore may not wish to slow down the payment process by performing process 420 et seq. In this case, the system may continue processing with process 413 when the customer's mobile identification information is not located.

In process 410, the located customer record is updated to record the current transaction and searched for applicable loyalty rewards. Coupon server 113 (FIG. 1) may receive information about the current transaction as well as information about previous transactions contained in the customer record and determine if the customer is eligible for any loyalty rewards. If the customer is eligible for a reward, the system will enter that reward in the customer record. Such reward could be based on previous customer activity, current purchase items, customer profile information, or any other criteria. A reward may also be entered into the customer's account as a result of the customer signing up for the loyalty program. The customer record may also contain a listing of rewards previously acquired by the customer and the system may search the customer record for such rewards that may be redeemed with the current purchase.

As shown in FIG. 4B, in process 411, if any loyalty rewards are to be applied to the current transaction, an adjusted amount due is generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

In process 412, the adjusted amount due is sent from processing platform 11 and received at POS terminal 20. In some embodiments, the adjusted amount due may be sent in a message over communications link 101.

In process 413, payment is accepted at POS terminal 20 from the customer for the adjusted amount due. Payment may be in any form such as cash, check, gift certificate, credit card, debit card, and/or the like. As described above, payment information may have been received in the form of payment device identification information during process 401. Where payment device identification information is received, either in process 413 or process 401, the payment device identification information may be transmitted to a third party payment processor such as payment processor 120 (FIG. 1) or may be transmitted to processing platform 11 (FIG. 1). If the payment device identification information is transmitted to processing platform 11, processes 312-314 (FIG. 3B) may then be performed.

In process 414, receipt 203 is printed for the customer. In some embodiments, the receipt 203 is printed at POS terminal 20 using printer 202. In addition to normal information that would be contained on a sale receipt as those skilled in the art would understand, the receipt may contain a promotional message about the loyalty program. For example, the receipt may contain text telling the customer how many purchases he or she is away from earning another loyalty reward. In another example, the receipt may contain text informing the consumer of future promotions. The receipt may also in some embodiments identify the amount of any discount applied. If the receipt is for a transaction involving a customer who is not a member of the loyalty program, the receipt may contain a message encouraging the customer to join the loyalty program. For example, the receipt may contain text explaining discounts that would have been applied if the customer was a member of the program. This promotional message could also contain instructions on how to join the loyalty program, including providing a phone number or web address for the customer to call to join the program. A system and process for enrolling customers in a loyalty program through a website or phone call are described in the above-identified application entitled "SYSTEM AND METHOD OF INTEGRATING LOYALTY/REWARD PROGRAMS WITH PAYMENT IDENTIFICATION INFORMATION."

In process 415, a promotional message is transmitted to the member's mobile device. If the search of mobile device identification information in process 404 successfully located a customer record, processing platform 11 may transmit a promotional message to the customer's mobile device 130 using the mobile device identification information stored in the customer's customer record over communications link 131. It should be understood that a customer record may contain more than one type of mobile device identification information. For example, a customer record may contain a serial number transmitted by the mobile device to identify the phone as well as another mobile device identification information that may be used to address a communication to the mobile device such as a phone number. The time of performance of process 415 is not linked to the time of performance of any other steps, except that it must be performed after process 404 because it relies on information located in process 404. In some embodiments, processing platform 11 may send an SMS message to the customer's mobile phone number using techniques and hardware known to those skilled in the art. The promotional message may or may not contain the information traditionally found on a receipt such as the amount due and the cost of items, and may contain information about the promotion received and the customer's current status in the loyalty program. The promotional message may also inform the customer about additional loyalty program options.

In process 420 (FIG. 4A), a message is transmitted indicating that the mobile device information was not located in the customer database. This message may be sent from processing platform 11 over communications link 101 to POS terminal 20. The message may be in any format understood by the POS terminal and may simply reference the specific transaction and contain an indicator that the mobile device identification information was not located in the customer database.

As shown in FIG. 4B, in process 421, a message is displayed asking the customer if he or she would like to join the loyalty program. In one embodiment, this message may be displayed on display 201 of POS terminal 20 (FIG. 2). The display may be visible to the merchant and not the customer and the merchant may orally ask the customer if he or she would like to join the loyalty program after the merchant sees the offer to join displayed on display 201. In another embodiment, the customer may view the offer directly.

In process 422, the customer's response to the prompt to join is captured. In one embodiment, the customer indicates his or her choice by selecting a choice using a data entry device at POS terminal 20 (FIG. 2) by depressing a key on a keypad or touching a portion of a touch screen display displaying his options. In another embodiment, the customer may orally announce his choice and the merchant may enter the choice using data entry device 204 at POS terminal 20.

Process 423 determines if the customer chooses to join the program. If the customer chooses to join the program, processing may continue with process 440, and if the customer chooses not to join the program, processing may continue with process 430. As discussed above, in some embodiments the merchant may elect not to prompt customers to join, in which case processes 420 and 421 may not occur. In another embodiment, a message may still be transmitted in process 420, but the POS terminal may automatically continue processing with process 430, bypassing processes 421, 422, and 423.

In process 430, a decline message is transmitted indicating that enrollment information will not be transmitted and processing of the transaction may continue. In some embodiments, this message is sent from POS terminal 20 over communications link 101 to processing platform 11 (FIG. 1). The message may be in any format understood by processing platform 11. The message may simply reference the specific transaction and contain an indicator that enrollment information will not follow and processing of the transaction should continue. Processing may then continue with process 413.

In process 440, the customer is prompted to provide sign-up information. The sign-up information requested may be any information required for a complete customer record. Such information may include basic identification information such as a name and address as well as contact information such as an e-mail address or mobile device identification information, such as a phone number for a mobile phone. Information previously obtained in process 401 may be displayed for the customer to confirm the accuracy of that information. The customer may also be asked if he or she would like to associate any payment devices with the account in-which case the system may capture information from those payment devices as described in process 301. The customer may be prompted by messages displayed on display 201 of POS terminal 20 (FIG. 2). The display may be visible to the merchant and not the customer and the merchant may orally ask the customer for the information requested or the customer may view the prompts directly.

In process 441, the customer's sign up information is captured. In one embodiment, the customer enters sign-up information using a data entry device 204 at POS terminal 20 (FIG. 2) by depressing keys on a keypad or touching a portion of a touch screen display displaying options. In another embodiment, the customer may verbally relay information to the merchant and the merchant may enter the information using data entry device 204 at POS terminal 20. The entered information may be displayed for the user allowing the user to confirm the information is correct before processing continues. It may be desirable for customers to be able to sign up for the merchant's loyalty program without first initiating a transaction and thus the merchant or customer may be able to initiate the sign up process by selecting an option from a main menu. In such a case, the sign-up process may begin with process 441.

As shown in FIG. 4C, in process 442, sign-up information is transmitted. The information is transmitted in a message sent from POS terminal 20 over communications link 101 to processing platform 11. The message may be in any format understood by processing platform 11. The message may reference the specific transaction and contain the sign-up information provided by the customer. The message may or may not contain information captured from the customer's payment card and previously transmitted in process 303.

In process 443, a customer record is created in the merchant's loyalty program's customer records database 111. The customer record is created at a processing platform 11. Coupon server 113 or another processing entity within processing platform 11 may be queried to identify any loyalty rewards applicable to enrolling members of the merchant's loyalty program. Any located loyalty rewards may then be placed in the customer record to be applied to the current transaction. In addition to use in the processes described herein, the customer record may be used in other facets of a loyalty program. Such other facets may include the transmitting of messages containing digital coupons to a customer's mobile device based on a customer's profile and not associated with any particular transaction. Such a system and method are described in the above referenced application entitled "A SYSTEM AND METHOD OF ALERTING USERS TO OFFERS USING ELECTRONIC DEVICES." After creating a customer record in process 444, processing of the transaction may immediately continue with process 411, while processes 444 and 445 may occur simultaneously, prior to, or subsequent to the transaction processing beginning with process 411.

In process 444, a welcome message is transmitted to the customer's mobile device. The message may be sent using the mobile device identification information provided by the customer in process 441 and stored in the customer record in process 443. The welcome message may be sent as an SMS message to the customer's mobile phone using the customer's mobile phone number stored in the customer's customer record as mobile device identification information. The welcome message may include information about the loyalty program, as well as promotional messages. Possible promotional messages are described above in the discussion of process m 415. In some embodiments, the welcome message may also contain instructions for opting out of receiving future messages on the mobile device. In some embodiments, the welcome message may also contain a request that the customer acknowledge the message in some fashion. Such an acknowledgment may be used to confirm that the customer provided valid and accurate mobile device identification information. In some embodiments, a customer may not be deemed a valid member of the loyalty program until the customer acknowledges the welcome message. The customer may acknowledge the welcome message in some embodiments simply by replying to the welcome message using the same communications protocol used to send the message. Other methods of acknowledging may include calling an activation number or visiting a specific website and signing in.

In process 445, a welcome receipt is printed for the customer. In some embodiments, the receipt may be printed on printer 202 at POS terminal 20 (FIG. 2). The receipt may be printed immediately after the customer enters his contact information or the receipt may not be printed until POS terminal 20 receives a confirmation message from processing platform 11 that the customer information was successfully entered into the customer database in process 443. The welcome receipt may contain program rules including privacy information, instructions for opting out of receiving future messages at the mobile device, instructions for quitting the program, as well as promotional messages.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing coupons to a mobile device in association with a purchase transaction at a Point of Sale (POS) system, the system comprising:
    one or more physical processors programmed with computer program instructions that, when executed by the one or more physical processors, cause the one or more physical processors to:
        detect the mobile device as proximate to the POS system based on the POS system wirelessly scanning for the mobile device;
        capture mobile device identification information from the mobile device;
        receive payment identification information in relation to the purchase transaction;
        determine whether a user account based on the mobile device identification information can be identified;
        when the user account based on the mobile device identification cannot be identified, then:
            send a notification, responsive to a determination to prompt the user account that cannot be identified, to request the user account based on the mobile device identification be generated;
            process the purchase transaction in response to a determination to refrain from prompting the user account that cannot be identified; and
        when the user account based on the mobile device identification can be identified, then:
            update the user account to record the purchase transaction;
            determine if the user account is eligible to receive a reward;
            if the user account is eligible to receive the reward, apply the reward to the user account;
            obtain coupon information based on the user account;
            identify a communication address for the mobile device based on the user account; and
            cause the coupon information to be transmitted to the mobile device using the communication address for the mobile device.

2. The system of claim 1, wherein the one or more physical processors is further programmed to:
    cause the POS system to print the coupon information.

3. The system of claim 1, wherein the one or more physical processors is further programmed to:
    receive, from the POS system, transaction information for the purchase transaction; and
    cause receipt information that includes the transaction information to be transmitted to the mobile device.

4. The system of claim 1, wherein to cause the coupon information to be transmitted to the mobile device, the one or more physical processors is programmed to:
    transmit the coupon information to the mobile device via a wireless communication link.

5. The system of claim 1, wherein to cause the coupon information to be transmitted to the mobile device, the one or more physical processors is programmed to:
    cause the coupon information to be transmitted to the mobile device via a network connection.

6. The system of claim 1, the system further comprising:
    a memory device configured to store the communication address for the mobile device, which comprises a phone number of the mobile device in association with the user account, wherein to cause the coupon information to be transmitted to the mobile device, the one or more physical processors is programmed to:
        cause the coupon information to be transmitted to the mobile device via a Short Message Service (SMS) text message to the phone number.

7. The system of claim 1, the system further comprising:
    a memory device configured to store the coupon information in association with the user account, wherein the coupon information is obtained from the memory device based on the association with the user account.

8. The system of claim 1, wherein the payment identification information is obtained from the mobile device.

9. The system of claim 8, wherein the payment identification information is obtained from the mobile device via a payment device reader configured to read the payment identification information from the mobile device.

10. The system of claim 9, wherein the payment device reader is configured to read the payment identification information via a Radio Frequency Identification (RFID) tag of the mobile device.

11. The system of claim 9, wherein the payment device reader is configured to read the payment identification information via a Near Field Communication (NFC) communication link with the mobile device.

12. The system of claim 1, wherein the coupon information includes a discount amount, from a price of an item, to be applied to the purchase transaction, and wherein the one or more physical processors is further programmed to:
    generate an adjusted total for the purchase transaction based on the discount amount;
    cause the adjusted total to be transmitted to a payment processing network for payment;

receive a confirmation from the payment processing network; and cause the confirmation to be transmitted to the POS system.

13. The system of claim 1, wherein the coupon information includes a discount amount, from a price of an item, to be applied to the purchase transaction, and wherein the one or more physical processors is further programmed to:

generate an adjusted total for the purchase transaction based on the discount amount; and cause the adjusted total to be transmitted to the POS system.

14. The system of claim 1, wherein the coupon information includes a discount amount, from a price of an item, to be applied to a future purchase transaction.

15. The system of claim 1, wherein the one or more physical processors is further programmed to:

receive, from the POS system, second payment identifying information, different from the payment identifying information, in relation to a second purchase transaction different from the purchase transaction;

identify the user account based on the second payment identifying information;

obtain second coupon information based on the user account;

identify the mobile device based on the user account; and cause the second coupon information to be transmitted to the mobile device.

16. A computer implemented method for providing coupons to a mobile device in association with a purchase transaction at a Point of Sale (POS) system, the method comprising:

detecting the mobile device as proximate to the POS system based on the POS system wirelessly scanning for the mobile device;

capture mobile device identification information from the mobile device;

receiving payment identification information in relation to the purchase transaction;

determining whether a user account based on the mobile device identification information can be identified;

when the user account based on the mobile device identification cannot be identified, then:
send a notification, responsive to a determination to prompt the user account that cannot be identified, to request the user account based on the mobile device identification be generated;
process the purchase transaction in response to a determination to refrain from prompting the user account that cannot be identified; and when the user account based on the mobile device identification can be identified, then:
update the user account to record the purchase transaction;
determine if the user account is eligible to receive a reward;
if the user account is eligible to receive the reward, applying the reward to the user account;
obtaining coupon information based on the user account;
identifying a communication address for the mobile device based on the user account; and
causing the coupon information to be transmitted to the mobile device using the communication address for the mobile device.

17. The method of claim 16, the method further comprising:
causing the POS system to print the coupon information.

18. The method of claim 16, the method further comprising:
receiving from the POS system, transaction information for the purchase transaction; and
causing receipt information that includes the transaction information to be transmitted to the mobile device.

19. The method of claim 16, wherein causing the coupon information to be transmitted to the mobile device comprises:
transmitting the coupon information to the mobile device via a wireless communication link.

20. The method of claim 16, wherein causing the coupon information to be transmitted to the mobile device comprises:
causing the coupon information to be transmitted to the mobile device via a network connection.

21. The method of claim 16, the method further comprising:
storing in a memory device, the communication address for the mobile device, which comprises a phone number of the mobile device in association with the user account, wherein to cause the coupon information to be transmitted to the mobile device; and
causing the coupon information to be transmitted to the mobile device via a Short Message Service (SMS) text message to the phone number.

22. The method of claim 16, the method further comprising:
storing in a memory device, the coupon information in association with the user account, wherein the coupon information is obtained from the memory device based on the association with the user account.

23. The method of claim 16, wherein the payment identification information is obtained from the mobile device.

24. The method of claim 23, wherein the payment identification information is obtained from the mobile device via a payment device reader configured to read the payment identification information from the mobile device.

25. The method of claim 24, wherein the payment device reader is configured to read the payment identification information via a Radio Frequency Identification (RFID) tag of the mobile device.

26. The method of claim 24, wherein the payment device reader is configured to read the payment identification information via a Near Field Communication (NFC) communication link with the mobile device.

27. The method of claim 16, wherein the coupon information includes a discount amount, from a price of an item, to be applied to the purchase transaction, the method further comprising:
generating an adjusted total for the purchase transaction based on the discount amount;
causing the adjusted total to be transmitted to a payment processing network for payment;
receiving a confirmation from the payment processing network; and
causing the confirmation to be transmitted to the POS system.

28. The method of claim 16, wherein the coupon information includes a discount amount, from a price of an item, to be applied to the purchase transaction, the method further comprising:
generating an adjusted total for the purchase transaction based on the discount amount; and
causing the adjusted total to be transmitted to the POS system.

29. The method of claim 16, wherein the coupon information includes a discount amount, from a price of an item, to be applied to a future purchase transaction.

30. The method of claim 16, the method further comprising:
receiving from the POS system, second payment identifying information, different from the payment identifying information, in relation to a second purchase transaction different from the purchase transaction;
identifying the user account based on the second payment identifying information;
obtaining second coupon information based on the user account;
identifying the mobile device based on the user account; and
causing the second coupon information to be transmitted to the mobile device.

31. A system for providing coupons to a mobile device in association with a mobile pay transaction at a Point of Sale (POS) system, the system comprising:
one or more physical processors programmed with computer program instructions that, when executed by the one or more physical processors, cause the one or more physical processors to:
detect the mobile device as proximate to the POS system based on the POS system wirelessly scanning for an identifier of the mobile device;
request mobile device identification information from the mobile device based on the identifier;
receive the mobile device identification information in relation to the mobile pay transaction;
determine whether a user account based on the mobile device identification information can be identified;
when the user account based on the mobile device identification cannot be identified, then:
send a notification, responsive to a determination to prompt the user account that cannot be identified, to request the user account based on the mobile device identification be generated;
process a purchase transaction in response to a determination to refrain from prompting the user account that cannot be identified; and
when the user account based on the mobile device identification can be identified, then:
update the user account to record the mobile pay transaction;
determine if the user account is eligible to receive a reward;
if the user account is eligible to receive the reward, apply the reward to the user account;
obtain coupon information based on the user account;
identify a communication address for the mobile device based on the user account; and
cause the coupon information to be transmitted to the mobile device using the communication address for the mobile device.

32. The system of claim 31, wherein the one or more physical processors is further programmed to:
cause the POS system to print the coupon information.

33. The system of claim 31, wherein the one or more physical processors is further programmed to:
receive, from the POS system, transaction information for the mobile pay transaction; and
cause receipt information that includes the transaction information to be transmitted to the mobile device.

34. The system of claim 31, wherein to cause the coupon information to be transmitted to the mobile device, the one or more physical processors is programmed to:
transmit the coupon information to the mobile device via a wireless communication link.

35. The system of claim 31, wherein to cause the coupon information to be transmitted to the mobile device, the one or more physical processors is programmed to:
cause the coupon information to be transmitted to the mobile device via a network connection.

36. The system of claim 31, wherein the communication address for the mobile device comprises a phone number of the mobile device, and wherein to cause the coupon information to be transmitted to the mobile device, the one or more physical processors is programmed to:
cause the coupon information to be transmitted to the mobile device via a Short Message Service (SMS) text message to the phone number.

37. The system of claim 31, the system further comprising:
a memory device configured to store the coupon information in association with the user account, wherein the coupon information is obtained from the memory device based on the association with the user account.

38. The system of claim 31, wherein the mobile device identification information includes payment identification information.

39. The system of claim 38, wherein the mobile device identification information is received from the mobile device via a payment device reader configured to read the mobile device identification information from the mobile device.

40. The system of claim 39, wherein the payment device reader is configured to read the mobile device identification information via a Radio Frequency Identification (RFID) tag of the mobile device.

41. The system of claim 39, wherein the payment device reader is configured to read the mobile device identification information via a Near Field Communication (NFC) communication link with the mobile device.

42. The system of claim 31, wherein the coupon information includes a discount amount, from a price of an item, to be applied to the mobile pay transaction, and wherein the one or more physical processors is further programmed to:
generate an adjusted total for the mobile pay transaction based on the discount amount;
cause the adjusted total to be transmitted to a payment processing network for payment;
receive a confirmation from the payment processing network; and
cause the confirmation to be transmitted to the POS system.

43. The system of claim 31, wherein the coupon information includes a discount amount, from a price of an item, to be applied to the mobile pay transaction, and wherein the one or more physical processors is further programmed to:
generate an adjusted total for the mobile pay transaction based on the discount amount; and
cause the adjusted total to be transmitted to the POS system.

44. The system of claim 31, wherein the coupon information includes a discount amount, from a price of an item, to be applied to a future purchase transaction.

* * * * *